United States Patent [19]
Sharper et al.

[11] Patent Number: 5,144,624
[45] Date of Patent: Sep. 1, 1992

[54] DIRECT DIGITAL ACCESS TELECOMMUNICATION SYSTEM WITH SIGNALING BIT DETECTION

[75] Inventors: Craig A. Sharper, Bridgewater, N.J.; Lynne A. Reamer, West Easton, Pa.

[73] Assignee: Integrated Network Corporation, Bridgewater, N.J.

[21] Appl. No.: 615,462

[22] Filed: Nov. 19, 1990

[51] Int. Cl.$^5$ .............................. H04J 3/12; H04J 1/00
[52] U.S. Cl. ................................... 370/110.1; 370/68.1
[58] Field of Search ................... 370/110.1, 68.1, 58.1, 370/58.2, 13, 112; 379/93, 94

[56] References Cited

U.S. PATENT DOCUMENTS

| | | | |
|---|---|---|---|
| 3,920,921 | 11/1975 | Pitroola et al. | 370/13 |
| 3,922,495 | 11/1975 | Donohoe | 370/110.1 |
| 4,059,731 | 11/1977 | Green et al. | 370/110.1 |
| 4,125,745 | 11/1978 | Steidl | 370/110.1 |
| 4,133,980 | 1/1979 | Moed | 379/288 |
| 4,271,509 | 6/1981 | Brolin | 370/110 |
| 4,320,505 | 3/1982 | Baun, Jr. et al. | 370/110 |
| 4,636,584 | 1/1987 | Binkerd et al. | 379/240 |
| 4,685,100 | 8/1987 | Coppens et al. | 370/68.1 |

OTHER PUBLICATIONS

AT&T Technical Reference TR41458, "Special Access Connections to the Special Access Connections to the AT&T Communications Network for New Service Applications", Oct. 1985.

Bellcore Technical Advisory TA-TSY-000077 Issue 3, "Digital Channel Banks for Dataport Channel Unit Functions", Apr. 1986.

Primary Examiner—Douglas W. Olms
Assistant Examiner—H. Kizou
Attorney, Agent, or Firm—Hamilton, Brook, Smith & Reynolds

[57] ABSTRACT

In a telecommunication system, a circuit is provided for determining the system mode and for restoring converted signalling bits. The circuit is designed to be used in a telecommunication system that lacks frame alignment. The circuit may serve as an trunk line interface located in a Direct Digital Access Office Channel Unit. Alternatively, the circuit may be coupled to a single trunk line which links Customer Premises Equipment (CPE) to the telecommunication system. The detection portion of the circuit determines the system mode of the trunk line connected to a CPE by detecting signalling bits when frame alignment is not maintained. The restoration portion of the circuit restores signalling bits which were converted due to a lack of frame alignment to their pre-converted state.

52 Claims, 4 Drawing Sheets

| SYSTEM MODE | 43 | 44 | 46 | 51 | 52 | 54 |
|---|---|---|---|---|---|---|
| ON-HOOK | 0 | 0 | 0 | 0 | 0 | 0 |
| MAINT. | X | X | X | X | 1 | 1 |
| OFF-HOOK | 1<br>X | X<br>1 | 1<br>1 | 1<br>1 | 0<br>0 | 1<br>1 |

Fig. 5b

| SYSTEM MODE | 40 | 61 | 62 | 65 | 72 |
|---|---|---|---|---|---|
| MAINT. | 0<br>1 | 1<br>1 | 1<br>1 | 1<br>1 | 0<br>1 |
|  | X<br>X | X<br>0 | 0<br>X | 1<br>1 | 0<br>0 |
|  | X | X | X | 0 | X |

Fig. 6

DIRECT DIGITAL ACCESS TELECOMMUNICATION SYSTEM WITH SIGNALING BIT DETECTION

BACKGROUND OF THE INVENTION

Direct Digital Access (DDA) is a method by which Customer Premises Equipment (CPE) may obtain dial-up data connections from a digital switching network (hereafter referred to as a digital switch) at speeds up to 56 Kilobits per second (Kbps). The local loop, which comprises the CPE and metallic telephone wires, is linked to the digital switching network via a Direct Digital Access Office Channel Unit (DDA/OCU). Presently, DDA/OCUs are located at telephone company offices. At the telephone company office, the DDA/OCU is placed in a digital channel bank and may be connected directly to the digital switch via one trunk line of a T1 carrier. Alternatively, the DDA/OCU may be connected to the digital switch through a Direct Access and Cross-connect Switch (DACS) or a DS-0 Cross Connection.

The T1 carrier has 24 trunk lines. The digital switch communicates over the trunk lines using a time division multiplexed digital signal format. The digital signal consists of 24 eight-bit bytes, multiplexed as one byte per trunk, plus a framing bit for each frame of the digital signal. The framing bit is used to identify where the byte allocated to each of the 24 trunks are located on the T1 carrier. The framing bit has a pattern which takes twelve frames to repeat. These twelve frames, numbered one through twelve, are termed a superframe. Normally, all eight bits of each byte transmitted during a frame contain encoded voice or digital data information. However, in every sixth frame the least significant bit is replaced with a signalling bit by the digital switch. These signalling bits are used between the digital switch and the CPE to indicate to the CPE the progress of communication during a call setup period. Thus, the sixth and twelveth frames for each superframe include a signalling bit in the eight bit position of each of the 24 bytes.

Currently, DDA/OCUs perform two conversion functions which allow a CPE access to the digital switching network. The DS-1 to DS-0 conversion function inserts and extracts the appropriate byte per frame allocated to a trunk line and provides a 64 Kbps DS-0 interface dedicated only to that trunk line. The OCU portion of a DDA/OCU converts the DS-0 signal to a 56 Kbps signal for transmission to the CPE.

The DDA portion of a DDA/OCU selects the eighth bit in the sixth frame of each superframe being transmitted by the digital switch and extracts the signalling bit. The state of the selected signalling bits is interpreted by the DDA to indicate an on-hook or off-hook condition, i.e. "system mode". By convention, if the signalling bit is a ZERO, which signifies on-hook, the DDA sends a control mode idle (CMI) signal to the CPE. If the signalling bit is a ONE, which signifies off-hook, it forces the eighth bit of every byte sent to the CPE to a ONE and allows the first seven bits to pass to the CPE.

The DDA also monitors the trunk line for loopback sequences signifying a maintenance situation. A loopback sequence begins with at least four consecutive loopback control codes, each having bit eight equal to a zero, and ends when loopback control codes have not been detected for four consecutive bytes. After receiving a loopback sequence, the DDA/OCU looks for loopback commands which consist of alternating bytes of loopback control codes and pseudorandom data having bit eight equal to one. Once a DDA/OCU detects a loopback command, the DDA/OCU must go transparent; whereby it does not interfere with any communications on the trunk line directed to the CPE. However, there are many problems currently involved with maintenance testing situations due to limitations in existing DDA/OCUs which make it difficult for a DDA/OCU to function properly in maintenance situations.

SUMMARY OF THE INVENTION

In telecommunication system configurations where a maintenance circuit is connected to at least one digital switch which is coupled to a DDA/OCU through a DACS for maintenance testing of a CPE, the DACS may not maintain frame alignment. Frame alignment is critical to the system, since downstream units such as a DDA/OCU relies upon frame alignment to maintain synchronization with the digital switches. Lacking frame alignment, the DACS may send signalling bit frames (i.e. normally the sixth and twelveth frames of every superframe) to a DDA/OCU on any frame. As a result of this lack of frame alignment, a DDA/OCU may experience signalling bit detection errors and provide the CPE with incorrect system mode indications.

Even if the DDA/OCU has no signalling bit detection errors, signalling bit insertions by each digital switch trying to overcome its lack of frame alignment may cause the maintenance circuit to receive erroneous data during loopback testing. A digital switch normally converts the least significant bit of each byte in every sixth frame to a signalling bit. However, a lack of frame alignment may cause each digital switch (already performing signalling bit insertion) to convert into signalling bits the eighth bit of each byte in frames not previously designated for signalling bits. These improperly converted bits are ultimately sent to the CPE by a DDA/OCU and adversely affect maintenance testing.

The present invention comprises a circuit for detecting signalling bits and thus determining the system mode and for correcting signalling bit insertion errors when frame alignment is not maintained. In a preferred embodiment, the circuit serves as an interface located in a DDA/OCU and which may be used during maintenance testing. In another embodiment, the circuit is adapted to be coupled to a single trunk line which links a CPE to a telecommunication system.

In more general terms, the invention comprises an improved telecommunication system in which a plurality of trunk lines are coupled to at least one digital switch. A CPE is coupled to the digital switch via a DACS, or in an alternative embodiment a DS-0 Cross Connection. Each trunk line receives one byte per frame of a digital multiplexed signal from the digital switch. The multiplexed signal is transmitted from the switch at a predetermined rate (i.e. 64 Kbps) in a set of frames. Each frame has a predetermined number of bytes of known bit length (i.e. 24 bytes of 8 bits), plus a known number of framing bits (i.e. 1). When frame alignment is maintained the Xth bit of each byte in every Yth frame corresponds to a signalling bit (i.e. $X=8$, $Y=6$). Each signalling bit has a first state which corresponds to a first system mode (i.e. on-hook) or a second state which correspond to a second system mode (i.e. off-hook).

A detection circuit is provided in accordance with this invention for determining the system mode of the trunk line connected to the CPE by detecting signalling bits when frame alignment is not maintained. The detection circuit selects and stores the Xth bit from each byte per frame allocated to the trunk line. A comparator compares stored Xth bits from frames which are Y frames apart and generates a comparator output. A processor interprets the comparator output and generates a system mode signal. This signal corresponds to an on-hook mode or an off-hook mode.

A maintenance override circuit for use in maintenance situations may also be provided. The maintenance override circuit is coupled to the processor and to the OCU portion of a DDA/OCU. When a maintenance situation occurs, the OCU sends a signal to the override circuit causing it to set the system mode output signal to the off-hook mode.

Recall that a lack of frame alignment may cause the digital switches to perform signalling bit insertion on frames not previously designated for insertion, converting the eighth bit of each byte in those frames with signalling bits. Accordingly, the present invention provides a bit restoration circuit for restoring bits from frames which have been converted to signalling bits by a digital switch when frame alignment is lost. Bits may be improperly converted by a DACS or a digital switch depending on the telecommunication system configuration. Bit restoration is achieved by selecting and storing Xth bits from each byte per frame allocated to the trunk line connected to the CPE. A comparator compares the Xth bit of a frame with the Xth bit of a frame W frames earlier and with the Xth bit of a frame Z frames earlier (i.e. $W=2$, $Z=4$). When the comparator determines an Xth bit was converted, it restores that Xth bit to its pre-converted state.

DETAILED DESCRIPTION OF THE PREFERRED EMBODIMENT

Figure 1:
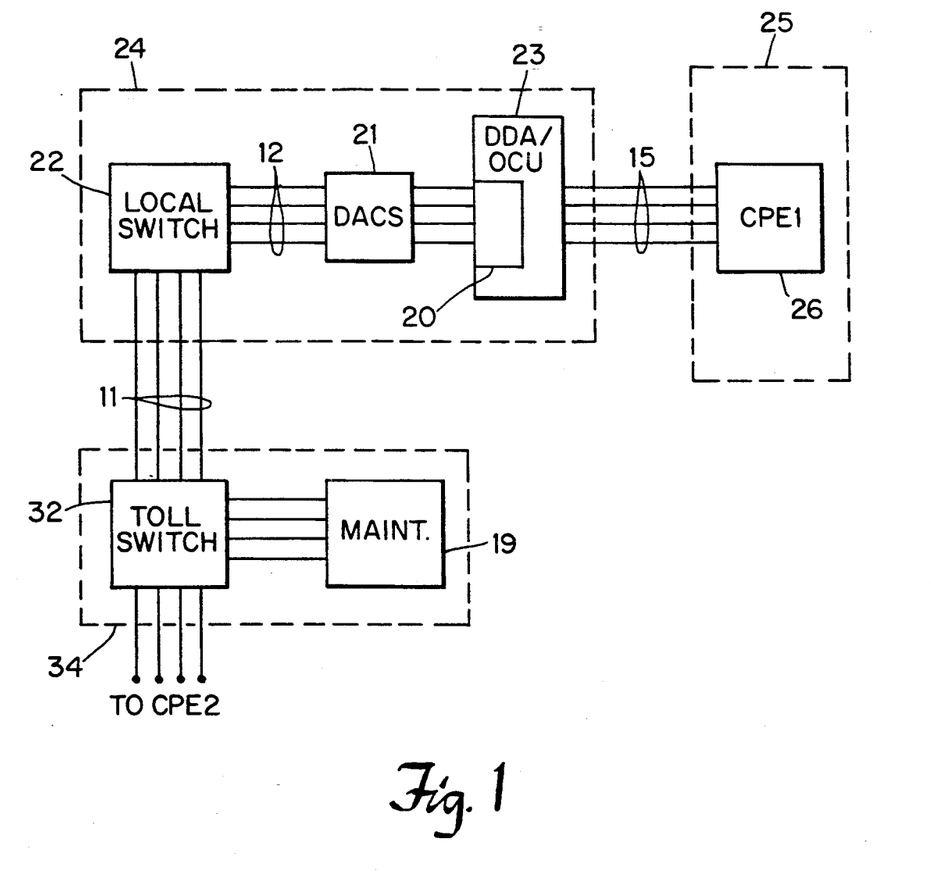
FIG. 1 is a block diagram of a digital data system connected to a CPE and having a DDA/OCU in accordance with the present invention.

A typical configuration for application of the present invention is shown in FIG. 1. The configuration includes Customer Premises Equipment (CPE) 26 located at a customer location 25 which is remote from a local central office 24. The CPE is linked to a local central office 24 via a trunk line 15 which comprises four-wire full duplex transmission lines. The local central office 24 comprises a local digital switch 22, a Direct Access and Cross-connect Switch (DACS) 21 and a DDA/OCU 23. In an alternative configuration (not shown), a DS-0 Cross Connection could replace the DACS 21. The DDA/OCU 23 contains the circuitry of the present invention in the form of an interface 20 for the DDA/OCU.

Figure 2:
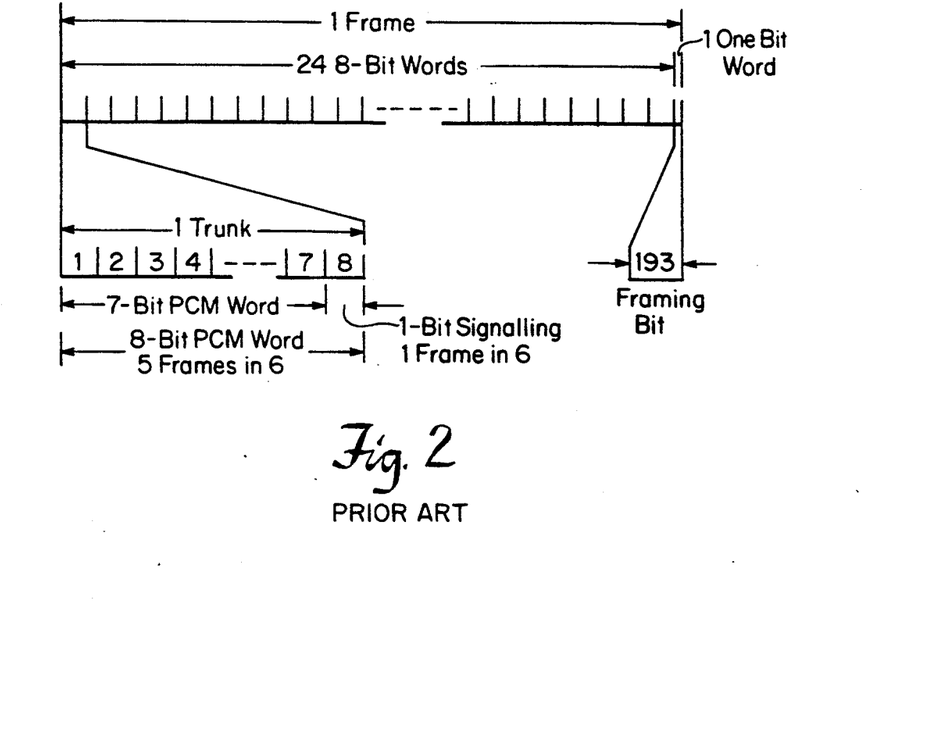
FIG. 2 is a prior art timing diagram illustrating one frame of a digital multiplexed signal used in the system of FIG. 1.
Figure 3:
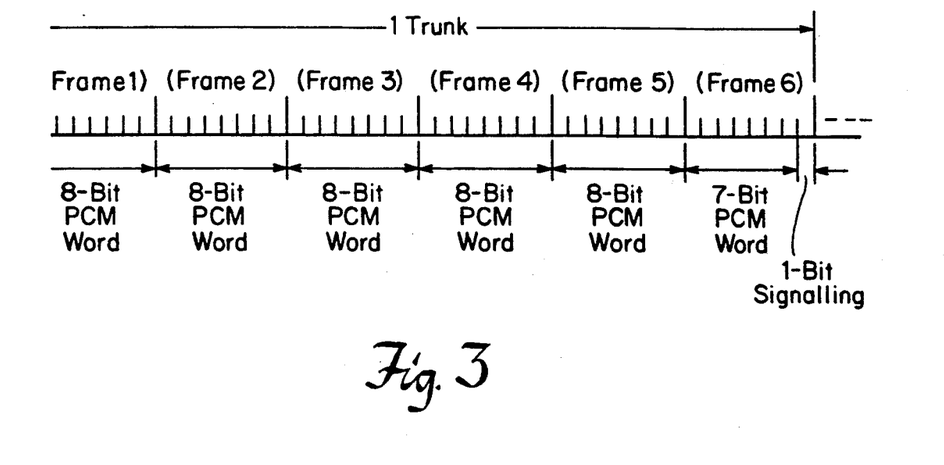
FIG. 3 is a timing diagram illustrating a plurality of bytes corresponding to multiple frames of the digital multiplexed signal of FIG. 2 allocated to a single trunk line.

The local switch 22 controls local central office communications with the CPE 26. The local switch is coupled to the CPE 26 via the DACS 21 and the DDA/OCU 23. The local switch has a trunk side which consists of multiple T1 carriers each capable of supporting 24 trunk lines. As shown in FIG. 1, the trunk line 15 is one of 24 trunks of a single T1 carrier coupled to the local switch 22 via an internal line 12, a DACS 21 and a DDA/OCU 23. As shown in the timing diagram of FIG. 2, each trunk line receives one byte per frame of a 1.536 Mbps multiplexed signal sent by the local switch 22. Each frame has 24 eight-bit bytes plus a framing bit. When frame alignment is maintained, the eighth bit of each byte in every sixth frame corresponds to a signalling bit as shown in FIG. 3.

Referring back to FIG. 1, telephone companies usually do not have a maintenance circuit in every local central office. Instead, the maintenance circuit is located in a toll switching office 34. The toll switching office 34 comprises a toll digital switch 32 and a maintenance circuit 19. Maintenance may be initiated for a remote trunk line connected to a CPE 26 by dialing through the toll switch 32, the local switch 22 to the trunk line 15 and the CPE 26.

When maintenance circuit 19 is coupled to the toll switch 32 for maintenance testing of the trunk line and the CPE 26, the switches and the DACS do not maintain frame alignment. For a device (i.e. a switch or DACS) to maintain frame alignment, unacceptable delays would be introduced into the system of FIG. 1. For example, suppose that frame six of an input superframe is received by a switch when that switch is sending frame seven of the corresponding output superframe. To maintain input/output frame alignment, the switch would be required to buffer (or delay) transmitting the data from input frame six until the next output superframe corresponds to frame six resulting in a delay of eleven frames. This buffering process would be required of each device in a system lacking frame alignment producing intolerable delays.

Beginning at the toll office 34, this means that a byte allocated to CPE1 entering the toll switch 32 on one frame of a superframe could exit the toll switch on any frame of the outgoing superframe. For example, a byte allocated to CPE1 entering the toll switch 32 on frame two of a superframe could exit the toll switch on frame six. But, the toll switch automatically performs signalling bit insertion by converting the eighth bit of each byte in the outgoing sixth and twelveth frames of every superframe with signalling bit information. Since input and output frames are not aligned, the toll switch may convert the eighth bit in each byte of a frame into a signalling bit although that frame may not have been previously used for signalling bits. Returning to the example, if the byte allocated to CPE1 exited the toll switch in frame six of a superframe, the eight bit of the byte would be converted to a signalling bit due to signalling bit insertion by the switch. Similarly, if the byte exited the toll switch in frame twelve, the eighth bit would be converted into a signalling bit. Furthermore, this signalling bit insertion may convert the eighth bit of a loopback control code (bit eight equals ZERO) with a ONE. If so, some of the loopback control codes would be erroneously converted to a data code.

The same bit conversion problem in the toll switch 32 also occurs in the local switch 22, due to a lack of frame alignment. Like the toll switch, the local switch may convert eighth bits of bytes of up to two additional frames per superframe, not so designated, into signalling bits.

Before the DDA/OCU receives a signal designated for the CPE 26, it first passes through a DACS 21 (or a DS-0 Cross Connection in an alternative embodiment). A DACS is similar to a digital switch in that any incoming byte on a frame can be coupled to any outgoing byte on any outgoing frame. This function is known as T1 changeover. But unlike a digital switch, a DACS may be programmed for a signalling bit insertion mode or a transparent mode having no bit insertion capability. In FIG. 1 it is assumed that the DACS is permanently programmed to the transparent so it does not perform signalling bit insertion. For this configuration however, the DACS also does not maintain frame alignment. Without frame alignment, signalling bit information entering the DACS in frames six and twelve every superframe may exit the DACS on any frame. For example, signalling bits, which enter the DACS in frames six and twelve could exit on frames four and ten. Since the DDA/OCU 23 is normally configured to detect signalling bits on frames six and twelve to determine the system mode, it may provide CPE1 26 with improper system mode indications.

Signalling Bit Detection Circuit

Figure 4:
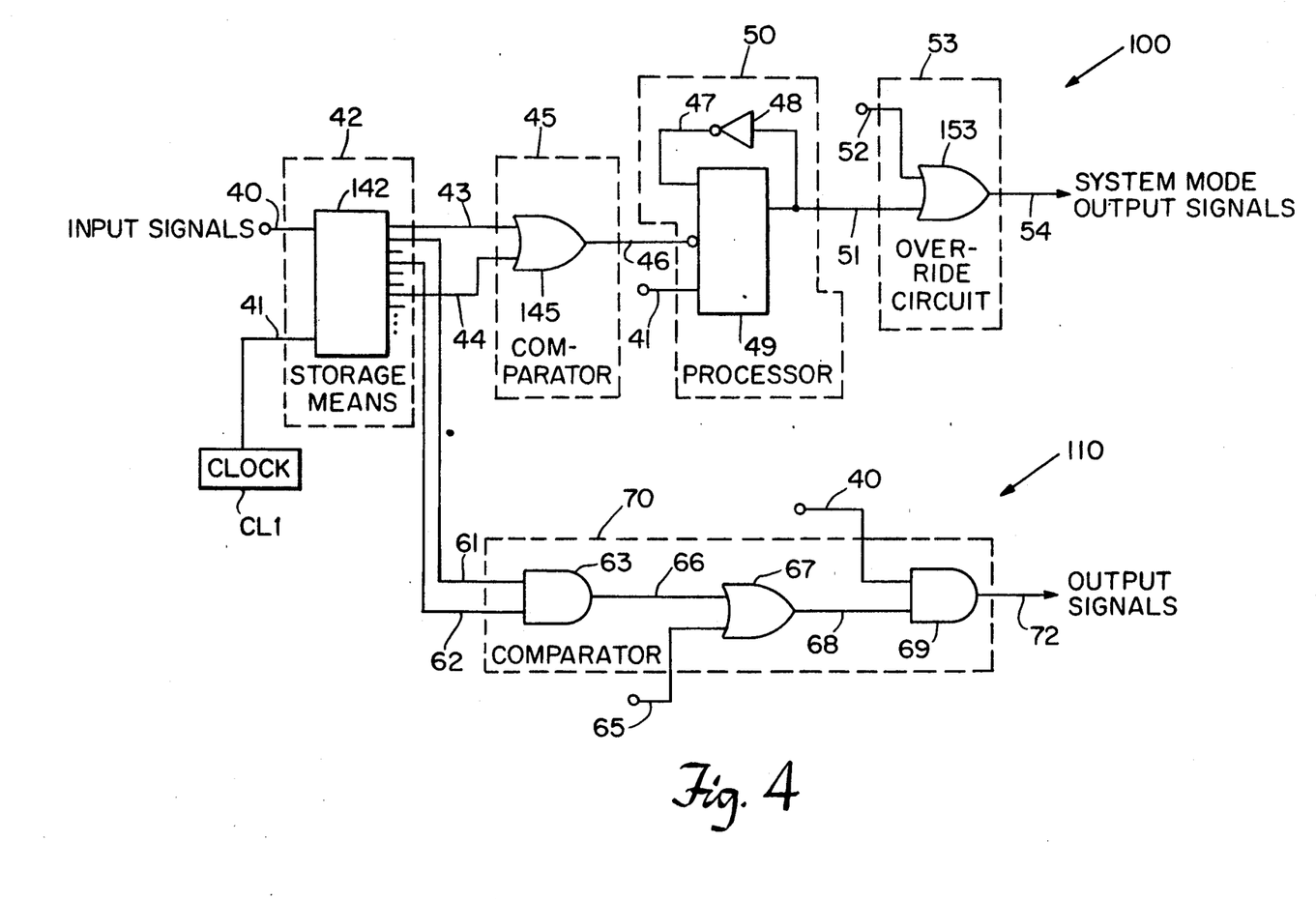
FIG. 4 is a schematic representation of the detection circuit and the bit restoration circuit of the present invention.

Referring to FIG. 4, a signalling bit detection circuit 100 which is a main portion of the interface 20 of FIG. 1 will now be discussed in detail. The signalling bit detection circuit of the present invention determines the system mode condition (i.e. on-hook or off-hook) without requiring frame alignment. Frame alignment is not necessary because the circuit 100 looks for signalling bits in every frame, not just in the sixth frame of every superframe as in existing DDA/OCUs. The circuit takes advantage of the fact that when the local switch 22 is sending signalling bits corresponding to the off-hook mode (bit eights equal one), the eighth bit is a ONE not just in frames six and twelve but in every frame. Therefore, ONES in the eighth bit of every frame correspond to an off-hook system mode. Similarly, an alternating pattern of ZEROES and ONES in the eighth bit of a number of consecutive frames may correspond to a maintenance system mode, as explained previously. Finally, ZEROES in the eighth bit position of frames which are six frames apart corresponds to the on-hook system mode. The signalling bit detection circuit 100 is configured to recognize these bit patterns and determine the system mode therefrom.

The signalling bit detection circuit is shown functionally in FIG. 4. For the system configuration of this embodiment, an input signal on line 40 coming from a DACS 21 has a rate of 64 Kbps and a signal structure according to FIG. 3. A storage means 42 comprising an eight-bit shift register 142 receives a clock signal from line 41 from clock CLI which has an 8 KHz rate. Using the clock signal, the shift register 142 selects only the eighth bit of each byte per frame. A number of selected eighth bits are stored in storage registers within the shift register 142. These stored bits are clocked onto output latches of the shift register for manipulation.

A comparator 45 comprises on OR gate 145 which compares stored eighth bits from the shift register 142 which are six frames apart and generates a comparator output signal on line 46. Accordingly, the comparator output will be ZERO only when both eighth bits from frames which are six frames apart are ZERO. Recall that ZEROES in the eighth bit position of bytes of frames which are six frames apart corresponds to the on-hook system mode. Also, an alternating pattern of ZEROES and ONES on the eighth bit position of bytes in consecutive frames corresponds to maintenance mode. So, the comparator output is ZERO only when the system is in the on-hook mode or in a maintenance situation.

Processor 50 interprets the comparator output and generates a signal 51 corresponding to an on-hook mode or an off-hook mode. This processor output signal 51 is sent to a maintenance override circuit 53. When the system is not in a maintenance situation, the processor output 51 simply passes through the maintenance override circuit and determines the system mode output signal 54. However, during maintenance situations, a maintenance override signal 52 is generated by the OCU and forces the system mode output signal 54 to corresponds to the off-hook system mode.

A processor 50 interprets the comparator output on line 46 and, depending on the comparator output, generates an output signal on line 51 corresponding to the system mode. Processor 50 comprises a counter 49 with carry-out signal on line 51 coupled to an inverter 48 which in turn is coupled back to a latch enable input of the counter on line 47. The counter 49 is a 4-bit binary counter synchronized to the shift register 142 by the clock input signal on line 41. The comparator output on line 46 corresponds to a counter reset input line and acts to clear the counter and the carry-out signal when it equals ZERO. Generally, the four-bit counter 49 is capable of counting up to fifteen, whereupon it generates a ONE at the carry-out signal in line 51 if not reset and begins counting up to fifteen again.

For this invention, the counter 49 is used to "hold" an on-hook or maintenance mode indication at the counter output 51 between frames (i.e. non-signalling bit frames one through five and seven through eleven). Recall that the comparator output 46 is a ZERO at least once every six frames when the system is in the on-hook mode or the maintenance mode. This occurrence produces a ZERO at the counter reset input on line 46 (at least once every six frames) which clears the counter 49 and sets the carry-out on line 51 to ZERO corresponding to the on-hook mode. But during the other five out of six frames, the comparator output may be a ONE even though the system actually is in the on-hook mode or the maintenance mode. When the comparator output 46 is a ONE, the counter 49 begins counting. However, the counter 49 does not generate a carry-out signal equal to ONE on line 52 until fifteen frames have been counted without a reset (i.e. a ZERO at the counter rest input 46). Since the comparator output is a ZERO once every six frames, the counter does not reach a count of fifteen and the carry-out signal is "held" equal to ZERO.

When the system is in the off-hook mode, the comparator output 46 is a ONE for every pair of compared frames, so the counter begins counting. If the counter is not reset after fifteen frames have passed, carry-out signal on line 51 will be set to a ONE. The inverted carry-out signal in line 47, which corresponds to the latch enable input, causes the counter 49 to then latch the carry-out signal on line 51 to a ONE. The carry-out signal on line 51 will remain latched to a ONE, corresponding to off-hook mode, until the comparator output 47 changes to ZERO.

The maintenance override circuit comprises an OR gate 53 which distinguishes between the on-hook mode and the maintenance mode. During maintenance situations, the OCU portion of the DDA/OCU generates a maintenance signal on line 52 equal to a ONE. A ONE at an input to the OR gate 53 produces a ONE at its output which corresponds to the system mode output on line 54. Thus, the maintenance signal in line 52 sets the system mode output 54 during maintenance situations. However, when the system is not in a maintenance situation, the maintenance signal 52 equals zero. In this situation, the carry-out signal at line 51 determines the system mode output 54.

Figure 5A:
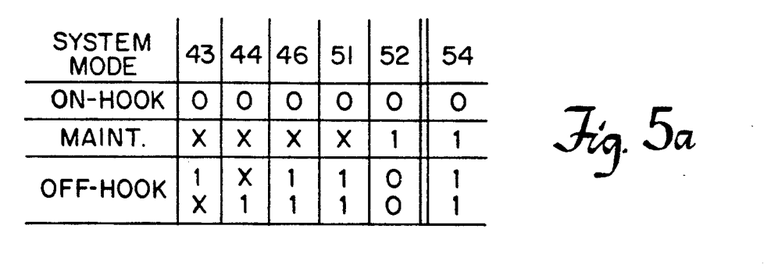
FIG. 5a is a truth table illustrating the functionality of the detection circuit of FIG. 4 in accordance with the present invention.

The truth table of FIG. 5a shows the state of various signals of the circuit 100 for each system mode. The on-hook system mode is detected when both eighth bits from frames which are six frames apart equal ZERO. Accordingly, the comparator inputs on lines 43 and 44 are ZERO and the comparator output on line 46 equals ZERO. The comparator output on line 46 corresponds to the counter reset input which acts to reset the counter and set the carry-out on line 51 to a ZERO. During the on-hook mode the maintenance signal from the OCU is also a ZERO so the system mode output on line 54 corresponds to a ZERO.

During the maintenance mode, the maintenance override circuit is activated when the OCU sets the maintenance signal in line 52 to a ONE. Since this occurrence sets the mode output signal to a ONE, other signals (i.e. on lines 43, 44, 46 and 51) are DON'T CARES which shown as Xs.

The on-hook system mode is detected when the carry-out signal on line 51 equals ONE. This requires a minimum of fifteen comparator output signals from line 46 equal to a ONE. Subsequently, a minimum of fifteen pairs of eighth bits from frames six frames apart on comparator input lines 43 and 44 must have had at least one bit per pair equal to a ONE. Also, the maintenance signal on line 52 is ZERO.

Bit Restoration Circuit

The bit restoration circuit of the present invention solves the problem of signalling bit insertion errors caused when the digital switches convert data bits to signalling bits. The bit restoration circuit restores converted bits to their pre-converted state. A functional depiction of the bit restoration circuit 110 is shown in FIG. 4.

As stated earlier, the input signal on line 40 has a rate of 64 Kbps and a signal structure according to FIG. 3. Recall that during maintenance testing, the eighth bit of each byte per frame of the input signal 40 alternates between zero and a one from frame to frame. Also recall that each digital switch performs signalling bit insertion on two frames per superframe or on one frame in any group of six frames. Since the system is usually in the off-hook mode (eighth bit equal to ONE in every frame) during maintenance, signalling bit insertion by the digital switches converts ZEROES into ONES. The system configuration of the preferred embodiment, shown in FIG. 1, has two digital switches so a maximum of two eighth bits are converted in any group of six frames.

The eight-bit shift register 142 receives an input signal from line 40 and processes the signal as explained in the signalling bit detection circuit 100. A comparator 70 has a first stage comprising an AND gate 63. The inputs on lines 61 and 62 to the AND gate 63 correspond to the eighth bits from two frames earlier and four frames earlier which were stored in the register 142. Notice that the first stage output 66 equals ONE only when both inputs on lines 61 and 62 164 are equal to ONE which corresponds to the situation when both eighth bits may have converted.

The second stage of the comparator 70 comprises an OR gate 67 having a gating signal input on line 65 which corresponds to the inverse of the clock signal from CLI on line 41. The gating signal on line 65 is equal to ONE, which forces the second stage output on line 68 to a ONE, except when the eight bit of any byte is selected by the shift register 142. By forcing its output on line 68 to a ONE, the second stage prevents the first stage output on line 66 from interfering with the passing of bits one through seven of each byte per frame of the input signal on line 40 through third stage AND gate 69 to the bit restoration output on line 72. However, when an eighth bit of any byte is selected by the register 142, the gating signal becomes a ZERO, allowing the second stage output on line 68 to follow the first state output of line 66.

The third stage of the comparator 70 comprises the AND gate 69. As explained above, bits one through seven of each byte per frame of the input signal on line 40 pass through the AND gate 69 undisturbed to the bit restoration output on line 72. For the eighth bit of each byte, the comparator 70 inspects the eighth bits from two frames previous (line 61) and four frames previous (line 62). If both eighth bits on lines 61 and 62 equal ONE, the input 68 becomes a ONE allowing the current eighth bit on line 40 to pass through the AND gate 69 unaltered. Since a maximum of two eighth bits are converted to ONES in any group of six frames, the eighth bit of a current frame on line 40 is assumed correct in this case. However, if either eighth bit on lines 61 or 62 is a ZERO, the comparator 70 assumes that the current eighth bit on line 40 was converted to a ONE. Operationally, the first stage output on line 66 becomes a ZERO which causes the second stage output on line 68 to become a ZERO. A ZERO at one input to AND gate 69 due to line 68 forces the restoration output on line 72 to a ZERO. Thus, the current eighth bit on line 40 is effectively "restored" to a ZERO by AND gate 69.

Figure 5B:
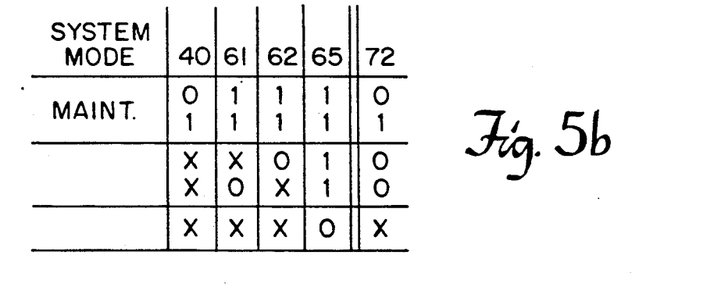
FIG. 5b is a truth table illustrating the functionality of the bit restoration circuit of FIG. 4 in accordance with the present invention.

A truth table depecting the state of various signals of the circuit 110 for bit restoration situations during maintenance is shown in FIG. 5b. When the gating signal on line 65 is equal to ONE, bits one through seven of each byte per frame of the input signal on line 40 pass through the AND gate 69 undisturbed to the bit restoration output on line 72. During this time, the bit restoration circuit is disabled.

For the eighth bit of each byte, the comparator 70 inspects the eighth bits from two frames previous (line 61) and four frames previous (line 62). When the eighth bits from two frames previous and four frames previous are both equal to ONE, the eighth bit of a current frame on line 40 is assumed correct. For this case, the bit restoration circuit allows the eighth bit of the current frame at line 40 to pass through the circuit to its output on line 72.

The bit restoration function occurs when either or both eighth bits of lines 61 and 62 are ZERO. Regardless of the actual state of the eighth bit of a current frame on line 40, the circuit 110 assumes that signalling bit insertion has converted the current eighth bit to a ONE. Based on this assumption, the circuit 110 "restores" the eight bit of a current frame on line 40 to a ZERO at the bit restoration output 72.

Figure 6:
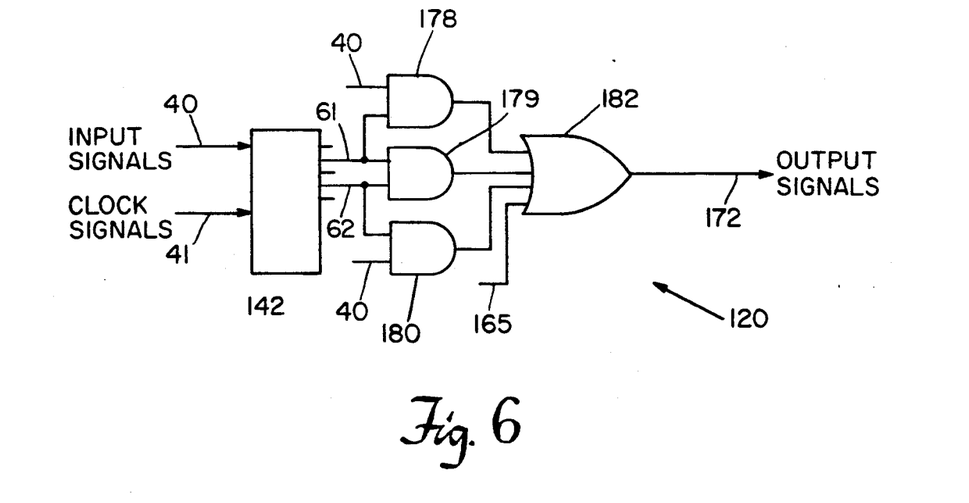
FIG. 6 is an alternative embodiment representation of the bit restoration circuit of FIG. 4.

An alternative implementation of the bit restoration circuit is the majority vote circuit 120 shown in FIG. 6. This circuit operates in system configurations where only one eighth bit from a group of six frames is converted. Additionally, the majority vote circuit 120 does not assume the system is in the off-hook mode during maintenance. In other words, an eighth bit may have been a ZERO converted to a ONE or a ONE converted to a ZERO.

The three OR gates (178–180) are arranged such that a current eighth bit on line 40 is compared separately to an eighth bit two frames previous (line 61) and four frames ago previous (line 62). Also, the eighth bits from two and four frames ago are compared. Since only one eighth bit per group of six frames is converted, at least one of the three comparasions produces an output identical to the non-converted eighth bits. For example, suppose the eighth bits from two and four frames previous on lines 61 and 62 are ONES. Further suppose the current eight bit on line 40 was converted to a ZERO, but should also be equal to a ONE. Accordingly, one of the three AND gates 179 has an output corresponding to a ONE, while the other two AND gate outputs correspond to a ZERO.

The three AND gate outputs serve as inputs to a majority vote OR gate 182. A gating signal input on line 165, with a signal structure as explained earlier, is also an input to OR gate 182. For each eighth bit, the gating signal is a ZERO and has no effect on the OR gate 182. Thus, based on the AND gate inputs, the majority vote OR gate 182 produces an output on line 187 which corresponds to a ONE for this example. The gating signal on line 165 is inverted by inverter 189 producing a ONE at line 188 for each eighth bit. A ONE on line 188 allows the majority vote output on line 182 to pass through AND gate 183. Since the output on line 172 corresponds to the bit restoration output, the eighth bit of a current frame (line 40) is restored to its pre-converted state. In fact, the circuit 120 produces the pre-converted value for a number of stored eighth bits at its output 172.

The gating signal input on line 165 allows bits one through seven of each byte per frame on line 40 to pass through the circuit 120 unaltered. The gating signal on line 165 is an input to OR gate 182 and inverter gate 189. Since the gating signal on line 165 is a ONE during bits one to seven of each byte per frame, the inverter output on line 191 is a ZERO during that time. Thus, the ZERO on line 191 is input to the OR gate 189, thereby allowing bits one to seven on line 40 to pass through the OR gate output on line 188. Since the gating signal on line 165 is also an input to OR gate 182, during bits one through seven the gating signal forces the OR gate output on line 187 to a ONE. A ONE on line 187 allows bits one to seven on line 188 to pass through AND gate 183 to the output on line 172.

EQUIVALENTS

While this invention has been shown and described with reference to a preferred embodiment thereof, it will be understood by those skilled in the art that various changes in form and details may be made therein without departing from the spirit and scope of the invention as defined by the appended claims. For instance, the system configuration of FIG. 1 features the present invention in a single representative system configuration. The present invention may be used in alternative system configurations such as one where the DACS is replaced a with two DS-0 dataports configured as a DS-0 Cross Connection. The DS-0 Cross Connection operates like a DACS except that it uses wiring connections to accomplish T1 changeover where a DACS is programmed to do so. Since the same frame alignment and signalling bit insertion problems exist in systems having a DS-0 Cross Connection, the present invention may be used in such systems. Furthermore, the present invention may be used in many alternative system configurations which may or may not require both the signalling bit detection capability and the bit restoration capability of the present invention. Moreover, the circuit implementations described herein may be varied to still achieve the same results.

We claim:

1. In a telecommunication system in which a plurality of trunk lines each receive one byte per frame of a digital multiplexed signal from a digital switch, wherein said multiplexed signal is transmitted at a predetermined rate in a set of frames and wherein each frame comprises a predetermined number of bytes of known bit length and wherein when frame alignment is maintained by the digital switch the Xth bit of each byte in every Yth frame corresponds to a signalling bit wherein each signalling bit has a first state corresponding to a first system mode or a second state corresponding to a second system mode; the improvement comprising:
   a circuit adapted to be coupled to a trunk line for determining the system mode of said trunk line when frame alignment is not maintained by the digital switch said circuit comprising:
   a) storage means for selecting and storing the Xth bit from each byte per frame allocated to said trunk line;
   b) comparator means for comparing the stored Xth bits of bytes from frames which are Y frames apart to determine the state of the Xth bit in each frame; and
   c) processing means coupled to said comparator means for generating a system mode indication signal based upon the comparison of said Xth bits as determined by said comparator means.

2. A circuit as claimed in claim 1 wherein the trunk line is connected to the digital switch via a Digital Access and Cross-connect Switch.

3. A circuit as claimed in claim 1 wherein each the trunk line is connected to the digital switch via a DS-0 Cross Connection.

4. A circuit as claimed in claim 3 wherein the trunk line to which the circuit is adapted to be coupled is one of a plurality of trunk lines each receiving one byte per frame of an M megabits per second digital multiplexed signal transmitted by the digital switch wherein said multiplexed signal is transmitted in multiple sets of frames wherein each frame comprises N bytes of R bits each and T framing bits and wherein said storage means comprises an M/NR KHz clocking device.

5. A circuit as claimed in claim 1 wherein the circuit is located within a Direct Digital Access Office Channel Unit.

6. In a telecommunication system wherein a maintenance circuit is coupled to a single trunk line through a number of digital switches and a Digital Access and Cross-connect Switch for maintenance testing of said trunk line, wherein a plurality of trunk lines each receive one byte per frame of a digital multiplexed signal sent by one of said digital switches and wherein said multiplexed signal is transmitted at M megabits per second in frames, wherein each frame has N bytes of R bits each plus T framing bits per frame and wherein when frame alignment is maintained by the switches, the Xth bit of each byte in every Yth frame corresponds to a signalling bit whereby each signalling bit has a first state corresponding to an on-hook system mode or a second state corresponding to an off-hook system mode wherein said off-hook mode is characterized by the Xth bit of each byte in every frame corresponding to said second state; the improvement comprising:

a circuit coupled to said trunk line for determining the system mode when frame alignment is not maintained by the switches comprising:
a) a shift register coupled to an M/NX MHz clock for selecting the Xth bit from each byte per frame allocated to said trunk line for storage and having latches for maintaining a number of the Xth bits at shift register outputs;
b) a comparator for comparing Xth bits which are Y frames apart and for generating a comparison signal indicative of said comparison; and
c) a processor for interpreting said comparison signal and generating an on-hook system mode signal or an off-hook system mode signal.

7. A circuit as claimed in claim 6 wherein M equals 1.536, N equals 24, R equals eight, T equals one, X equals eight and Y equals six.

8. A circuit as claimed in claim 6 wherein the circuit further comprises a maintenance override means coupled to the processing means for setting the system mode indication signal generated by said processing means to an off-hook system mode during maintenance.

9. A circuit as claimed in claim 1 wherein X equals eight and Y equals six.

10. A telecommunication system in which a plurality of trunk lines each receive one byte per frame of a digital multiplexed signal from a first digital switch, the multiplexed signal is transmitted at a predetermined rate in a set of frames wherein each frame comprises a predetermined number of bytes of known bit length and wherein when frame alignment is maintained by the switch the Xth bit of each byte in every Yth frame corresponds to a signalling bit having a first state signifying a first system mode or a second state signifying a second system mode, wherein said second system mode is characterized by the Xth bit of each byte in every frame corresponding to said second state, the telecommunication system having a circuit adapted to be coupled to one of said trunk lines for determining the system mode when frame alignment is not maintained by the switch; said circuit comprising:
a) storage means for selecting and storing the Xth bit from each byte per frame allocated to said trunk line;
b) comparator means for comparing the stored Xth bits of bytes from frames which are Y frames apart to locate a pair of signalling bits having said first state; and
c) processor means coupled to said comparator means for generating a system mode indication signal based upon said comparison.

11. A circuit as claimed in claim 4 wherein M equals 1.536, N equals 24, R equals eight, T equals one, X equals eight and Y equals six.

12. A telecommunication system as claimed in claim 10 wherein each signalling bit has a first state corresponding to an on-hook system mode or a second state corresponding to an off-hook system system mode.

13. A telecommunication system as claimed in claim 12 further comprising a maintenance circuit coupled to a second digital switch which is coupled to the first digital switch which is connected to the trunk line.

14. A telecommunication system having a circuit as claimed in claim 13 wherein said storage means includes:
a) a clocking means for selecting the Xth bit from each byte per frame allocated to said trunk line; and
b) a shift register with output latches for maintaining a number of Xth bits at the shift register outputs.

15. A telecommunication system wherein a maintenance circuit is selectively coupled to a signal trunk line through a number of digital switching machines and a Digital Access and Cross-connect Switch for maintenance testing of said trunk line, wherein a plurality of trunk lines each receive one byte per frame of a digital multiplexed signal from one of said digital switching machines and wherein said multiplexed signal is transmitted at M megabits per second in frames, wherein each frame has N bytes of R bits each plus T framing bits and wherein when frame alignment is maintained by said switching machines the Xth bit of each byte in every Yth frame corresponds to a signalling bit whereby each signalling bit has a first state corresponding to an on-hook system mode or a second state corresponding to an off-hook system mode wherein said off-hook mode is characterized by the Xth bit of each byte in every frame corresponding to said second state; said telecommunication system having an apparatus connected to the trunk line comprising:

an interface coupled to said trunk line for determining the system mode wherein frame alignment is not maintained by the switching machines comprising:
a) first means for storing a plurality of said Xth bits from each byte per frame allocated to said trunk line;
b) second means for comparing stored Xth bits which are Y frames apart to generate a comparison signal indicative of the system mode; and
c) third means for setting said comparison signal to correspond to the off-hook system mode during maintenance testing.

16. A telecommunication system as claimed in claim 15 wherein M equals 1.535, N equals 24, R equals eight, T equals one, X equals eight, Y equals six.

17. A telecommunication system as claimed in claim 15 wherein the circuit is an interface for a Direct Digital Access Office Channel Unit.

18. A circuit coupled to a trunk line for determining a telecommunication system mode when frame alignment is not maintained comprising:
a) storage means for selecting and storing an Xth bit of each byte of a digital signal from a digital switch coupled to a plurality of trunk lines, wherein when frame alignment is maintained by the switch the Xth bit of each byte in every Yth frame corresponds to a signalling bit whereby each signalling bit has a first state corresponding to a first system mode or a second state corresponding to a second system mode said second system mode being characterized by the Xth bit of each byte in every frame corresponding to said second state; and b) processing means for comparing the stored Xth data bits of bytes from frames which are Y frames apart and for generating a system mode indication signal as a result of said comparison.

19. A telecommunication system as claimed in claim 10 wherein X equals eight and Y equals six.

20. A circuit as claimed in claim 18 wherein said storage means comprises a shift register for selecting and storing the Xth bit of each byte of an M/N kilobits per second digital signal.

21. A circuit as claimed in claim 18 wherein X equals eight, M equals 1.536, N equals 24 and Y equals six.

22. In a telecommunication system in which a plurality of trunk lines each receive one byte per frame of a digital multiplexed signal from a digital switch, wherein said multiplexed signal is transmitted at a predetermined rate in a set of frames, wherein each frame is divided into a predetermined number of bytes of known bit length and wherein when frame alignment is maintained by the switch the Xth bit of each byte in every Yth frame corresponds to a signalling bit whereby each signalling bit has a first state corresponding to a first system mode or a second state corresponding to a second system mode; a method of determining the system mode for one of said trunk lines when frame alignment is not maintained by the switch, comprising the steps of:

a) storing the Xth bit from each byte per frame designated for the trunk line;

b) comparing the Xth bits of frames which are Y frames apart to determine the system mode; and c) generating a system mode output signal indicative of said comparison.

23. A method as claimed in claim 22 wherein X equals eight and Y equals six.

24. A method as claimed in claim 22 wherein each signalling bit has a first state corresponding to an on-hook system mode and a second state corresponding to an off-hook system mode.

25. A method as claimed in claim 22 further comprising setting the system mode via a maintenance override means to the second system mode during maintenance testing.

26. In a telecommunication system in which a plurality of trunk lines each receive one byte per frame of a digital multiplexed signal from a digital switch, wherein said multiplexed signal transmits at M megabits per second in frames, wherein each frame has N bytes of R bits each plus T framing bits per frame and wherein when frame alignment is maintained by the switch, the Xth bit of each byte in every Yth frame corresponds to a signalling bit whereby each signalling bit has a first state corresponding to an on-hook system mode or a second state corresponding to an off-hook system mode wherein said second system mode is characterized by the Xth bit of each byte in every frame corresponding to said second state, a method of determining the system mode for one of said trunk lines when frame alignment is not maintained by the switch, comprising the steps of:

a) storing the Xth bit from each byte per frame designated for the trunk line;

b) comparing Xth bits of frames which are Y frames apart to determine the system mode; and c) generating a system mode output signal indicative of said comparison.

27. A method as claimed in claim 26 wherein M equals 1.536, N equals 24, R equals eight, T equals one, X equals eight and Y equals six.

28. A method as claimed in claim 26 further comprising setting the system mode output signal to the off-hook system mode during maintenance testing.

29. A circuit adapted to be coupled to a trunk line in a telecommunication system in which a plurality of trunk lines each receive one byte per frame of a digital multiplexed signal from a digital switch, wherein said multiplexed signal is transmitted at a predetermined rate in a set of frames and wherein a predetermined Xth bit of each byte per frame may be in a first state or a second state and wherein when the telecommunication system lacks frame alignment due to the switch, said Xth bit of each byte per frame is potentially converted to the second state every Y frames by the switch in performing signalling bit insertion the circuit comprising:

a) storage means for selecting and storing said Xth bit from each byte per frame allocated to the trunk line; and b) processing means coupled to said storage means for detecting converted Xth bits and restoring said converted Xth bits to their pre-converted state.

30. A circuit as claimed in claim 29 wherein the processing means comprises a comparator coupled to the storage means for comparing for each Xth bit the Xth bit of the frame W frames earlier and the Xth bit of the frame Z frames earlier and based on said comparison, restoring each converted Xth bit to its pre-converted state.

31. A circuit as claimed in claim 29 wherein the storage means comprises an clock for selecting the Xth bit from each byte per frame allocated to said trunk line and a storage device for storing a plurality of Xth bits.

32. In a telecommunication system in which a maintenance circuit is coupled to a single trunk line, through a number of digital switching machines and a Direct Digital Access/Office Channel Unit (DDA/OCU), for maintenance testing of said trunk line, wherein a plurality of trunk lines each receive one byte per frame of a digital multiplexed signal from one of said digital switching machines, wherein said multiplexed signal is transmitted at a rate of M megabits per second in a set of frames and has N bytes of R bits plus T framing bits per frame and wherein the Xth bit of each byte per frame has a first state or a second state and wherein when frame alignment is not maintained by said switching machines the Xth bit of each byte per frame is potentially converted to the second state by each switching machine in performing signalling bit insertion once for every Y frames, the improvement comprising:

a circuit adapted to be coupled to said trunk line for restoring converted Xth bits comprising a) a shift register coupled to an M/NX MHz clock for selecting the Xth bit from each byte per frame allocated to said trunk line for storage and having output latches for maintaining a number of said Xth bits at shift register outputs; and b) a comparator coupled to said shift register output latches for restoring a converted Xth bit to its pre-converted state based on a comparison of the Xth data bit of the frame two frames earlier and the Xth data bit of the frame four frames earlier.

33. A circuit as claimed in claim 32 wherein M equals 1.536, N equals 24, R equals eight, T equals one, X equals eight and Y equals six.

34. A circuit as claimed in claim 33 wherein the said circuit is located within the DDA/OCU.

35. A telecommunication system in which a plurality of trunk lines each receive one byte per frame of a digital multiplexed signal from a digital switch, wherein said multiplexed signal transmits at a rate of M megabits per second and has N bytes of R bits plus T framing bits per frame, wherein an Xth bit of each byte per frame may be in a first state or a second state and wherein when the telecommunication system lacks frame alignment due to the switch said Xth bit of each byte is potentially converted to the second state by the switch in performing signalling bit insertion every Y frames, said telecommunication system including a circuit adapted to be coupled to one of said trunk lines for restoring converted Xth bits to their pre-converted state said circuit comprising:
   a) storage means for storing the Xth bit from each byte per frame allocated to said line; and
   b) processing means coupled to said storage means for detecting converted Xth bits and for restoring said Xth bits to their pre-converted state.

36. A telecommunication system as claimed in claim 35 wherein the storage means comprises an M/NX MHz clock for selecting the Xth bit from each byte per frame and a storage device for storing a plurality of selected Xth bits.

37. A telecommunication system as claimed in claim 36 wherein the processing means comprises a comparator coupled to said storage means for restoring a converted Xth bit to its pre-converted state based on a comparison of the Xth data bit of the frame two frame earlier and the Xth data bit of the frame four frames earlier.

38. A telecommunication system as claimed in claim 37 wherein M equals 1.536, N equals 24, R equals eight, T equals one, X equals eight and Y equals six.

39. A telecommunication system as claimed in claim 35 wherein the trunk line is connected to the digital switch via a Digital Access and Cross-connect switch.

40. A telecommunication system as claimed in claim 35 wherein the trunk line is connected to the digital switch via a DS-0 Cross Connection.

41. A telecommunication system in which a maintenance circuit is coupled to a single trunk line through a number of digital switching machines, wherein a plurality of trunk lines each receive one byte per frame of a digital multiplexed signal from one of said digital switching machines, wherein said multiplexed signal is transmitted at a predetermined rate in frames of fixed bit length and wherein the Xth bit of each byte per frame has a first state or a second state and wherein when frame alignment is not maintained by said switching machines the Xth bit of each byte per frame is potentially converted to the second state by each switching machine performing signalling bit insertion once in every Y frames, said telecommunication system having an apparatus comprising:
   a circuit coupled to said trunk line for restoring converted Xth bits comprising
      a) a storage means for selecting and storing the Xth bit from each byte per frame allocated to said trunk line; and
      b) a comparator coupled to said storage means for comparing, for each converted Xth bit, the Xth bit of the frame W frames earlier and, when at least one of said compared Xth bits is in the first state restoring the converted Xth bit to the first state.

42. A telecommunication system as claimed in claim 41 wherein the apparatus having the circuit for restoring converted Xth bits is located within Direct Digital Access Office Channel Unit.

43. A telecommunication system as claimed in claim 41, wherein X equals eight, Y equals six, W equals two and Z equals four.

44. In a telecommunication system in which a plurality of trunk lines each receives one byte per frame of a digital multiplexed signal from a digital switch having a plurality of bytes of known bit length in each frame and wherein the Xth bit of each byte per frame has a first state or a second state and wherein when the switch lacks frame alignment the Xth bit of each byte per frame is potentially converted to the second state by the switch in performing signalling bit insertion every Y frames, a method of restoring converted Xth bits comprising the steps of:
   a) storing a plurality of Xth bits of each byte per frame designated for said trunk line;
   b) comparing, for each stored Xth bit, the Xth bit W frames previous with the Xth bit Z frames previous; and
   c) restoring the Xth bit to the first state when at least one of said compared Xth bits is in the first state.

45. A method as claimed in claim 44, wherein X equals eight, Y equals six, W equals two and Z equals four.

46. In a telecommunication system in which a plurality of trunk lines each receive one byte per frame of an M megabits per second digital multiplexed signal from a local digital switch having N bytes of R bits plus T framing bits in each frame, wherein the local switch is coupled to a toll switch, wherein the Xth bit of each byte per frame has a first state or a second state and wherein when the switches lack frame alignment the Xth bit of each byte per frame is potentially converted to the second state by each switch performing signalling bit insertion in every Y frames, a method of restoring converted Xth bits comprising the steps of:
   a) storing a plurality of Xth bits of each byte per frame designated for said trunk line;
   b) comparing, for each stored Xth bit, the Xth bit two frames previous and with the Xth bit four frames previous; and
   c) restoring the Xth bit to the first state when at least one of said compared Xth bits is in the first state based on said comparison.

47. A method as claimed in claim 46 wherein M equals 1.536, N equals 24, R equals eight, T equals one, X equals eight and Y equals six.

48. A method as claimed in claim 30 wherein x equals eight, Y equals six, W equals two and Z equals four.

49. A circuit for coupling to a trunk line of a telecommunication system in which a digital multiplexed signal is transmitted at a predetermined rate in a set of frames by a digital switch, wherein the trunk line receives on byte per frame of the signal, the circuit comprising:
   a) storage means for selecting and storing Xth bits from each byte per frame of the signal received by the trunk line; and
   b) processing means coupled to said storage means for converting stored Xth bits from a second state to a first state every Y frames by comparing, for each of the Xth bits, the Xth bit of a frame occurring W frames earlier and the Xth bit of a frame occurring Z frames earlier and based on said comparison setting each converted Xth bit to the first state.

50. A circuit as claimed in claim 49 wherein X equals eight, W equals two, Y equals six and Z equals four.

51. A circuit for coupled to a trunk line of a telecommunication system in which a digital multiplexed signal is transmitted at a predetermined rate in a set of frames by a digital switch, the trunk line receiving one byte per frame of the signal, the circuit comprising:

a) storage means for selecting and storing Xth bits of each byte per frame of the signal received by the trunk line, wherein the Xth bit of each byte in every Yth frame defines a signalling bit having a first state designating a first system mode or a second state designating a second system mode, and wherein when the telecommunication system is in the second system mode the Xth bit of each byte per frame of the signal received by the trunk line corresponds to said second state; and b) processing means for comparing the stored Xth data bits of bytes from frames which are Y frames apart and for generating a system mode indication signal as a result of said comparison.

52. A circuit as claimed in claim 51 wherein X equals eight and Y equals six.

* * * * *

UNITED STATES PATENT AND TRADEMARK OFFICE
CERTIFICATE OF CORRECTION

PATENT NO. : 5,144,624
DATED : September 1, 1992
INVENTOR(S) : Craig A. Sharper and Lynne A. Reamer It is certified that error appears in the above-identified patent and that said Letters Patent is hereby corrected as shown below:

Col. 15, line 35, change the second occurrence of "frame" to ---frames---.

Col. 16, line 1, after earlier insert ---and the Xth bit of the frame Z frames earlier---.

Col. 16, line 61, delete "on" and insert ---one---.

Col. 17, line 8, delete "coupled" and insert ---coupling---

Signed and Sealed this

Twenty-fourth Day of August, 1993

Attest:

BRUCE LEHMAN

*Attesting Officer*     *Commissioner of Patents and Trademarks*